No. 728,379. PATENTED MAY 19, 1903.
J. DITSON.
ROLLING AND TRIMMING MACHINE.
APPLICATION FILED AUG. 16, 1902.
NO MODEL. 2 SHEETS—SHEET 1.
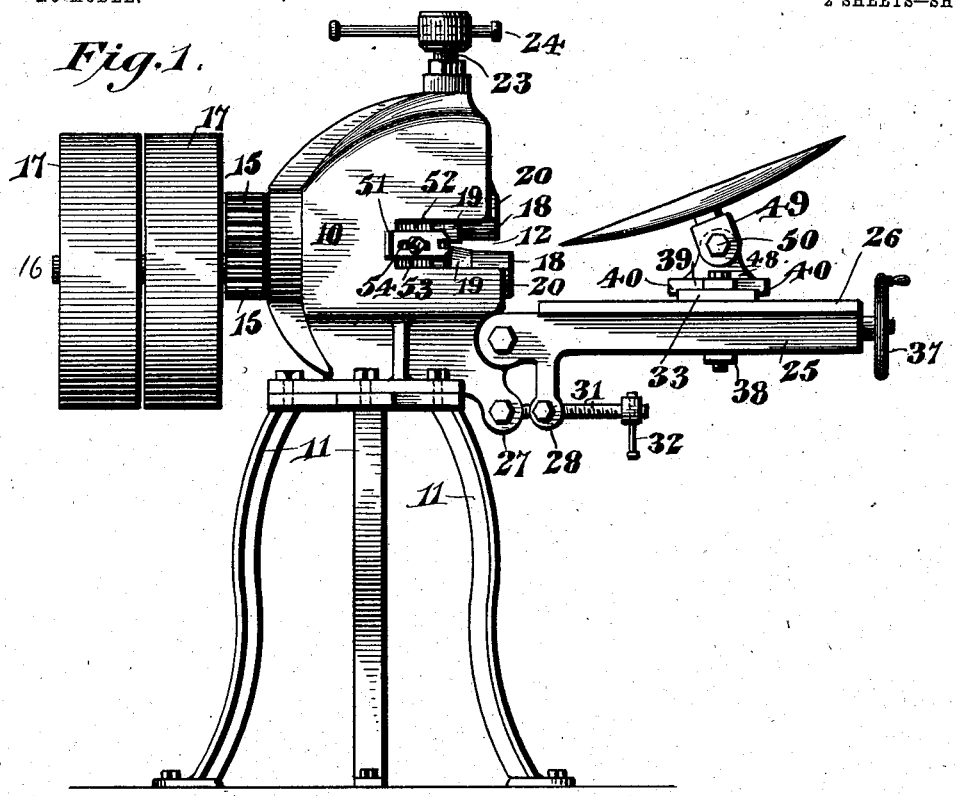
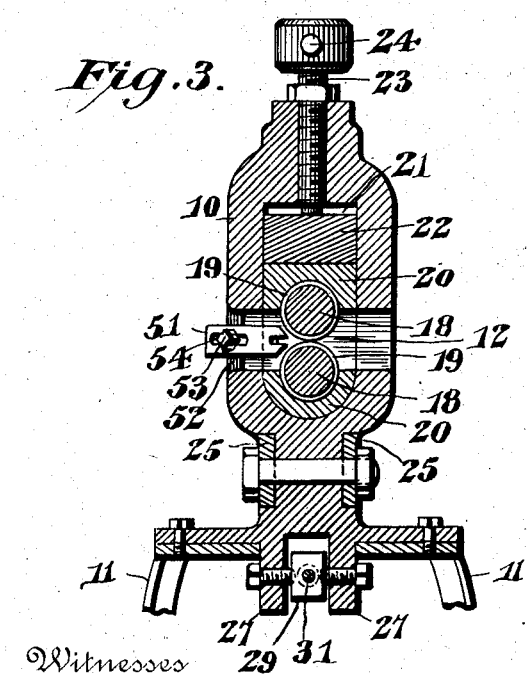
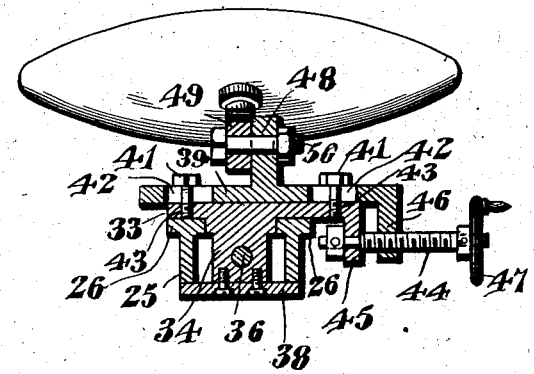
John Ditson, Inventor
Witnesses

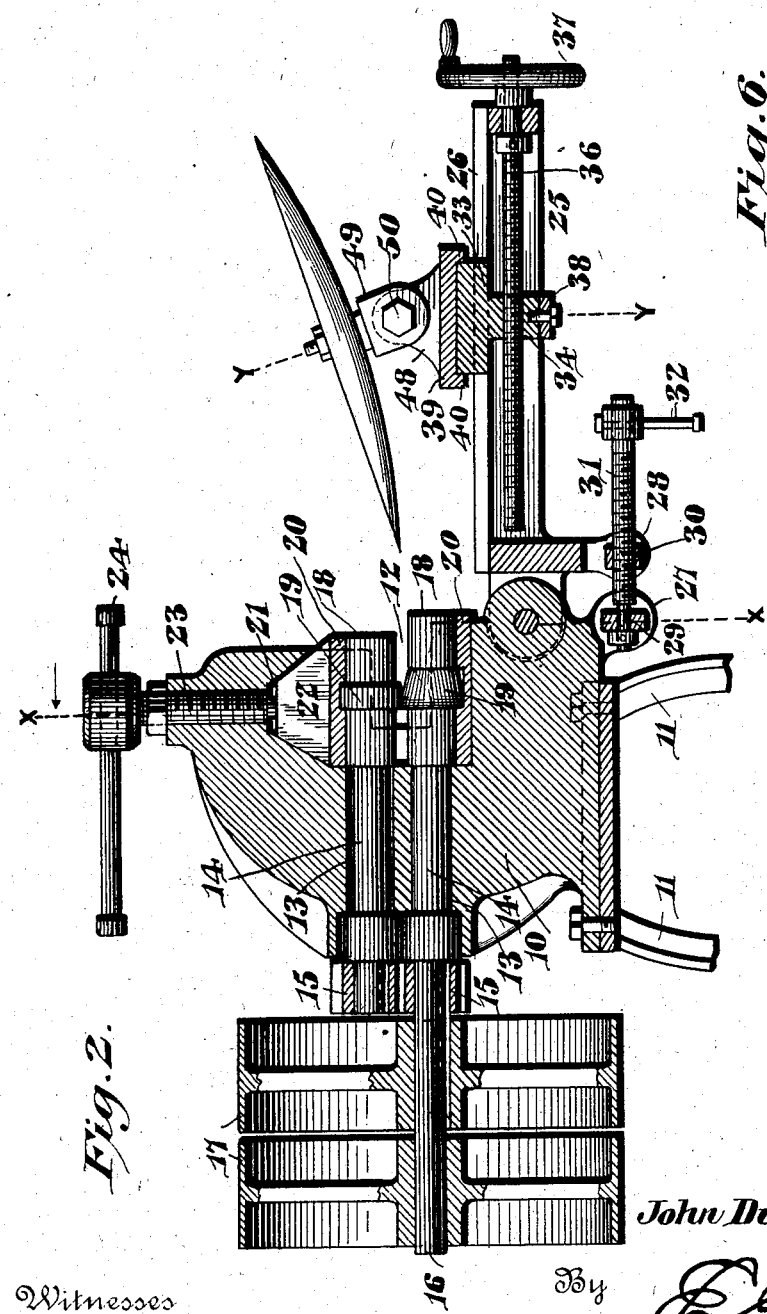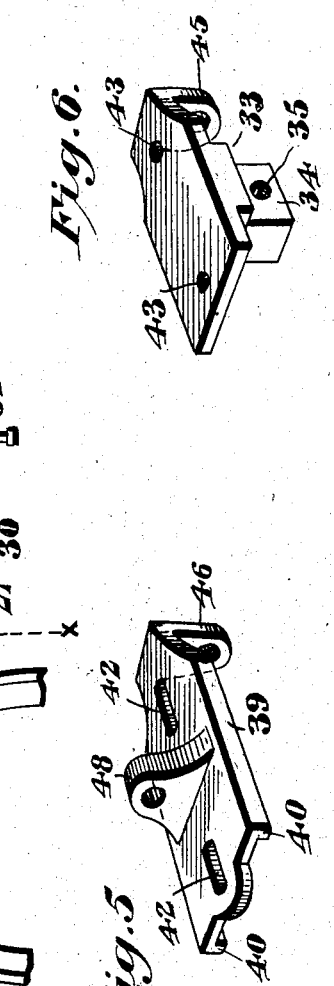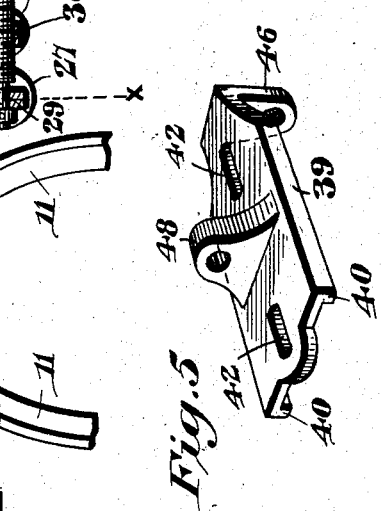

No. 728,379. Patented May 19, 1903.

UNITED STATES PATENT OFFICE.

JOHN DITSON, OF GALENA, KANSAS.

ROLLING AND TRIMMING MACHINE.

SPECIFICATION forming part of Letters Patent No. 728,379, dated May 19, 1903.

Application filed August 16, 1902. Serial No. 119,949. (No model.)

*To all whom it may concern:*

Be it known that I, JOHN DITSON, a citizen of the United States, residing at Galena, in the county of Cherokee and State of Kansas, have invented a new and useful Rolling and Trimming Machine, of which the following is a specification.

This invention relates particularly to machines for trimming and sharpening disks of harrows, plows, and other agricultural implements.

One of the objects of the invention is to produce mechanism for sharpening disks by cold-rolling the edges thereof, said mechanism being comparatively simple and yet capable of exerting very great pressure upon the edges to be sharpened. This mechanism is also adjustable to work of various sizes and different shapes.

As is well known to those skilled in the art, disks will often wear unevenly, and thus lose their circular shape. A further object, therefore, is to provide trimming means for cutting, and thus truing, the peripheries of the disks.

These several objects are accomplished by the mechanism illustrated in the accompanying drawings, and it will be seen upon an inspection of the claims hereto appended that the structure illustrated is open to various changes and modifications.

In the drawings, Figure 1 is a side elevation of the improved machine. Fig. 2 is a longitudinal sectional view on a somewhat-enlarged scale. Fig. 3 is a vertical sectional view taken on the line $x\ x$ of Fig. 2. Fig. 4 is a sectional view taken on the line $y\ y$ of Fig. 2. Figs. 5 and 6 are detail perspective views of the sections comprising the work-holding carriage.

Similar reference-numerals indicate corresponding parts in all the figures of the drawings.

In the embodiment of the invention shown a body 10 is employed, preferably of cast metal and supported upon suitable standards 11, attached to the base of said body. This body is provided in one side with a socket 12, and spaced shaft-receiving openings 13 extend through the body to said shaft. A pair of parallel shafts 14 are journaled in the openings 13, said shafts having intermeshing spur-wheels 15 at their rear ends. The rear end of one shaft projects beyond the other, as shown at 16, and upon this projecting end are secured separate pulleys 17, one being keyed to the shaft, the other being loose. The other ends of the shafts carry coacting rolls 18, having coacting annular work-engaging enlargements 19, the peripheral work-engaging faces of one enlargement being parallel to the axis of the roll, while that of the other is arranged at an inclination and tapers, as clearly shown in Fig. 2. The adjacent faces of these rolls are arranged to engage the work, as will be readily understood, while their outer oppositely-disposed faces are seated in bearings, shown in the form of removable brasses 20, having recesses to receive the enlargements 19, the brass for the lower roll resting against the lower end of the socket 12, whereby a firm support is provided for said roll. The upper roll is movable toward and from the lower roll, and a tapered seat 21 is formed in the body 10 above the same. In this seat is fitted a tapering block 22, that rests upon the brass 18. A compression-screw 23 is threaded vertically through the upper portion of the body 10 and bears upon the outer end of the block 22, said screw having a suitable operating-handle, as 24.

Pivoted to the body 10 directly beneath the socket 12 is a carriage-supporting table 25, having spaced tracks 26, that extend from a point contiguous to the lower end of the socket 12. The body 10 is provided directly below the pivot connection of the table with spaced ears 27, and the pivoted end of the table in like manner has spaced depending ears 28, arranged in alinement with the ears 27. Blocks 29 and 30 are journaled between the respective ears, and a screw 31 has its inner end journaled in the block 29, said screw having a threaded engagement with the block 30. This screw is also provided with a suitable handle 32, and as a result of this construction it will be seen that when the screw 31 is rotated the carriage-supporting table can be swung vertically upon its pivot.

A work-holding carriage is slidably mounted upon the table 25 and is movable toward and from the rolls. This carriage comprises a base-section 33, having a depending ear 34, fitting between the tracks 26 and provided with a screw-threaded opening 35. Passing through this opening is a screw 36, said screw being arranged longitudinally between the tracks 26 and being journaled at its outer end in the end of the table 25, said outer end having a suitable operating-wheel 37. The base-section 33 is fastened upon the table by a cross-plate 38, secured to the lower end of the ear 34 and extending across beneath the tracks 26. A work-carrier section 39 is slidably mounted upon the base-section 33 and is movable transversely of the table 25, this section having depending flanges 40, which engage the opposite edges of the base-section. It is held against movement by suitable headed screws 41, passing through slots 42, formed in the carrier-section, and engaging in suitably-threaded openings 43, constructed in the upper portion of the base. The carrier-section is moved by means of a screw 44, which, as shown in Fig. 4, is journaled at its inner end in a depending ear 45, located at one end of the base-section, and has a threaded engagement with another ear 46, arranged upon the carrier-section, this screw being also provided with a suitable handle-crank 47. The carrier-section is furthermore provided with an upstanding intermediately-disposed projection 48, to which is pivotally attached an upstanding work-holding post 49, secured by a pivot-bolt 50 to the projection 48, the upper end of the post being threaded to receive a holding-nut.

There is also employed in connection with the rolling mechanism means for trimming the edges to secure circularity in the disks operated upon. This means is shown in the form of a cutting-tool 51, bifurcated at its operative end to embrace the edge of a disk and being adjustably secured to an inclined wall 52, leading to the socket, by means of a set-screw 53, passing through a slot 54, formed in the tool. Thus the cutting end of the tool is located directly adjacent to the rolls, as illustrated in Figs. 1 and 3.

Power is transmitted to the machine by a suitable driving-belt passed around the pulleys and movable onto either by any suitable mechanism.

In use a disk is attached to the post 49, and the carriage is moved toward the rolls until the edge of said disk will be properly positioned between them, this adjustment being obtained by swinging the table 25. The rolls are then forced tightly against the opposite faces of the disk contiguous to its edge by means of the compression-screw, after which the driving-belt is moved onto the tight pulley. As a consequence the rolls will compress and taper the edges of the disk, and consequently sharpen the same. In case the edge of a disk is not true to the circumference of a circle it may be easily made so by first loosening the rolls and moving the edge of the disk into engagement with the cutting-tool. The rolls are then tightened sufficiently to constitute means for rotating the disk, and during such rotation the tool will trim off the enlarged portions, thus bringing the disk to a true circle, after which it may be sharpened, as above described. There are distinct advantages for the construction set forth. In the first place it will require a powerful pressure upon the rolls to accomplish the sharpening action, and at the same time it is desirable to have these rolls as light as possible. Both these advantages are obtained in the present structure by supporting the rolls in the manner shown, the lower one being solidly seated upon the brass, which in turn rests upon the body 10, while the upper brass for the lower roll bears upon said roll directly over the work-engaging portion. The cutter is also an important feature, as it affords simple means for trimming the disk. The rolls co-act with this cutter in that they constitute the means for actuating the disks. The means for accomplishing the various adjustments are very simple and at the same time efficacious, as it will be apparent that disks of various sizes and shapes may be operated upon.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a machine of the class described, the combination with a body having a socket in one side, upper and lower chambers communicating with the socket, and shaft-receiving openings extending to the socket, shafts journaled in the openings and carrying coacting rolls that are located in the socket, and journal-brasses located in the chambers and interposed between the rolls and the walls of the body.

2. In a machine of the class described, the combination with a supporting-body having a socket, of substantially parallel rolls journaled in the socket and having enlarged annular coacting work-engaging faces, the face of one roll being substantially parallel to the axis of the same, and the face of the other roll being tapered, and journal-brasses bearing against the rolls on opposite sides of the enlarged work-engaging faces.

3. In a machine of the class described, the combination with a supporting-body having a socket, of coacting rolls journaled in the socket, a carriage-supporting table pivoted to the support, and a screw pivoted at one end to the support and engaging the table.

4. In a machine of the class described, the combination with a support, of coacting rolls journaled on the support, a carriage-table pivoted to the support and having a depending ear at its pivoted end, and a screw pivoted at one end to the support and having a threaded engagement with the ear of the carriage-supporting table.

5. In a machine of the class described, the combination with a support, of coacting rolls journaled on the support, a pivoted carriage-table, a block journaled to the support, another block journaled upon the table, and an adjusting-screw journaled in one block and having a threaded engagement with the other.

6. In a machine of the class described, the combination with a support, of sharpening mechanism mounted upon the support, a work-supporting carriage, an upright work-holding post upon which a disk may be journaled, so that its edge will be operated upon by the sharpening mechanism, and a substantially horizontal pivot connecting the post and the carriage.

7. In a machine of the class described, the combination with a support, of coacting rolls journaled upon the support, a work-supporting carriage movable toward and from the rolls, an upstanding work-holding post upon which a disk may be journaled so that its edges will pass between the rolls, and a substantially horizontal pivot connecting the post to permit the disk being arranged at different angles of inclination.

8. In a machine of the class described, the combination with sharpening mechanism, of a carriage-table located adjacent to the sharpening mechanism, a carriage slidably mounted upon the table and movable toward and from the sharpening mechanism, said carriage comprising a base-section, a work-carrying section slidable upon the base-section and movable transversely of the table, a screw engaging the sections to move said work-carrier, and an upstanding work-holding post pivoted upon the carrier-section and movable therewith, said post constituting a journal upon which a disk can be rotatably mounted and is adjustable to different inclinations.

9. In a machine of the class described, the combination with sharpening mechanism, of a carriage-table located adjacent to the sharpening mechanism, a carriage slidably mounted upon the table and movable toward and from the sharpening mechanism, said carriage comprising a base-section, a work-carrier section slidable upon the base-section and movable transversely of the table, said work-carrying section having a longitudinal slot, both sections having depending ears, a screw engaging the ears of the sections and having a threaded connection with one of said ears, and a headed screw passing through the slot of the work-carrier section and engaging the base-section.

10. In mechanism of the class described, the combination with a support, of coacting rolls journaled upon the support, a stationary cutting-tool located contiguous to the rolls and arranged to engage the edge of the work passed between the rolls, and a work-holding device.

11. In a machine of the class described, the combination with a support, of coacting rolls journaled upon the support, a stationary cutting-tool adjustably mounted upon the support contiguous to the rolls and arranged to engage the edge of work passed therebetween, and a work-holding journal-post located adjacent to the rolls and tool.

12. In a machine of the class described, the combination with a supporting-body having a socket in one side, and an inclined base extending to the socket, of coacting rolls located in the socket, a cutting-tool fastened to the inclined face, and a work-holder arranged contiguous to the rolls.

13. In a machine of the class described, a pair of coacting rolls arranged one above the other, said rolls having annular work-engaging enlargements, the enlargement of one of the rolls having its face arranged parallel with the axis of said roll, and the other enlargement having its face tapered, the tapered enlargement being of greater width than the other, and tapering to the face of the roll, whereby it is caused to project beyond the same, and constitutes a guide during the insertion of the work between the rolls.

14. In mechanism of the class described, the combination with a support, of coacting rolls journaled upon the support and arranged one above the other, and a stationary cutting-tool arranged contiguous to the rolls and having its operative portion alined with the space between the rolls, and adapted to trim the edge of work passed between the rolls.

15. In mechanism of the class described, the combination with a support, of a pair of coacting rolls arranged one above the other, and a cutting-tool mounted on the support adjacent to the rolls and adjustable toward and from the same.

16. In mechanism of the class described, the combination with a support, of a pair of coacting rolls arranged one above the other, and a cutting-tool mounted on the support adjacent to the rolls and adjustable toward and from the same, the operative end of the cutting-tool being bifurcated.

17. In a machine of the class described, the combination with a body having a socket in one side, upper and lower chambers communicating with the socket, and shaft-receiving openings extending to the socket, of an upper and a lower shaft journaled in the openings, rolls carried by the shafts and arranged in the socket, said rolls having intermediately-disposed work-engaging enlargements and the lower roll being longer than the upper one, a stationary journal-brass fitted in the lower chamber and resting on the body below the lower roll, said brass extending the entire length thereof and having an intermediate recess that receives the enlargement, and another brass adjustably fitted in the upper chamber and bearing upon the upper face of the upper roll, said latter brass having an intermediate recess that receives the enlargement of said upper roll.

18. In a machine of the class described, a pair of coacting rolls arranged one above the other, said rolls having intermediate annular work-engaging enlargements that terminate short of the ends thereof, the enlargement of one roll having its face disposed parallel with the axis of said roll and the other enlargement tapering toward its outer end to the surface of the roll, whereby the article operated upon may be readily directed between the enlargements.

19. In mechanism of the class described, the combination with a support, of coacting rolls journaled upon the support, and a stationary cutting-tool located contiguous to the rolls and arranged to engage the edge of the work passed between the rolls.

20. In mechanism of the class described, the combination with a support, of coacting rolls journaled upon the support, a work-holding pivot arranged to support a disk with the edge between the rolls, and a trimming-tool located contiguous to the rolls and arranged to engage the edge of the disk passed between said rolls.

21. In mechanism of the class described, the combination with a support, of coacting rolls journaled upon the support, a work-holding pivot arranged to support a disk with the edge between the rolls, and a single stationary trimming-tool located contiguous to the rolls and arranged to engage the edge of the disk passed between said rolls.

22. In a machine of the class described, the combination with a body having a socket in one side, upper and lower chambers communicating with the socket, and shaft-receiving openings extending to the socket, of an upper and a lower shaft journaled in the openings, rolls carried by the shafts and arranged in the socket, said rolls having intermediately-disposed work-engaging enlargements, a stationary journal-brass fitted in the lower chamber and resting on the body below the lower roll, said brass extending the entire length thereof, and another brass adjustably fitted in the upper chamber and bearing upon the upper face of the upper roll.

In testimony that I claim the foregoing as my own I have hereto affixed my signature in the presence of two witnesses.

JOHN DITSON.

Witnesses:
J. G. HAMMOND,
H. A. BROUNE.